US006248240B1

(12) United States Patent
Ohkawa

(10) Patent No.: US 6,248,240 B1
(45) Date of Patent: Jun. 19, 2001

(54) PLASMA MASS FILTER

(75) Inventor: Tihiro Ohkawa, La Jolla, CA (US)

(73) Assignee: Archimedes Technology Group, Inc., San Diego, CA (US)

( * ) Notice: Subject to any disclaimer, the term of this patent is extended or adjusted under 35 U.S.C. 154(b) by 0 days.

(21) Appl. No.: 09/464,518

(22) Filed: Dec. 15, 1999

Related U.S. Application Data

(63) Continuation-in-part of application No. 09/192,945, filed on Nov. 16, 1998, now Pat. No. 6,096,220.

(51) Int. Cl.$^7$ .............................. B03C 1/00; B01D 21/26
(52) U.S. Cl. .................. 210/695; 210/748; 210/787; 210/222; 210/243; 210/512.1; 209/12.1; 209/227; 209/722; 96/2; 96/3; 95/28; 95/269; 55/447
(58) Field of Search ........................ 210/222, 223, 210/243, 695, 748, 787, 512.1; 209/12.1, 227, 722; 95/28, 269; 96/1, 2, 3; 55/447

(56) References Cited

U.S. PATENT DOCUMENTS

| 3,722,677 | 3/1973 | Lehnert . |
| 5,039,312 | 8/1991 | Hollis, Jr. et al. . |
| 6,096,220 | * 8/2000 | Ohkawa .............................. 210/695 |

OTHER PUBLICATIONS

Bittencourt, J.A., and Ludwig, G.O.; Steady State Behavior of Rotating Plasmas in a Vacuum–Arc Centrifuge; *Plasma Physics and Controlled Fusion*, vol. 29, No. 5, pp. 601–620; Great Britain, 1987.

Bonnevier, Björn; Experimental Evidence of Element and Isotope Separation in a Rotating Plasma; *Plasma Physics*, vol. 13; pp. 763–774; Northern Ireland, 1971.

Kim, C.; Jensen, R.V.; and Krishnan, M; Equilibria of a Rigidly rotating, Fully Ionized Plasma Column; *J. Appl. Phys.*, vol. 61, No. 9; pp. 4689–4690; May, 1987.

Dallaqua, R.S.; Del Bosco, E.; da Silva, R.P.; and Simpson, S.W; Langmuir Probe Measurements in a Vacuum Arc Plasma Centrifuge; *IEEE Transactions on Plasma Science*, vol. 26, No. 3, pp. 1044–1051; Jun., 1998.

Dallaqua, Renato Sérgio; Simpson, S.W. and Del Bosco, Edson; Experiments with Background Gas in a Vacuum Arc Centrifuge; *IEEE Transactions on Plasma Science*, vol. 24, No. 2; pp. 539–545; Apr., 1996.

Dallaqua, R.S.; Simpson, S.W.; and Del Bosco, E; Radial Magnetic Field in Vacuum Arc Centrifuges; *J. Phys. D.Apl. Phys.*, 30; pp. 2585–2590; UK, 1997.

Evans, P.J.; Paoloni, F. J.; Noorman, J. T. and Whichello, J. V.; Measurements of Mass Separation in a Vacuum–Arc Centrifuge; *J. Appl phys.* 6(1); pp. 115–118; Jul. 1, 1989.

Geva, M.; Krishnan, M; and Hirshfield J.L.; Element and Isotope Separation in a Vacuum–Arc Centrifuge; *J. Appl. Phys* 56(5); pp. 1398–1413; Sep. 1, 1984.

(List continued on next page.)

*Primary Examiner*—David A. Reifsnyder
(74) *Attorney, Agent, or Firm*—Nydegger & Associates

(57) ABSTRACT

A method for separating charged particles according to their mass requires providing a multi-species plasma in a chamber. The plasma includes both relatively low-mass charged particles ($M_1$) and relatively high-mass charged particles ($M_2$) which are influenced by crossed electric and magnetic fields (E×B) in the chamber. Specifically, the crossed fields (E×B) rotate the particles $M_1$ and $M_2$ in respective orbits that are characteristic of the mass of the particular particle. Inside the chamber, each charged particle has a respective cyclotron frequency ($\Omega$), and the plasma is maintained with a density wherein the collisional frequency ($\nu$) of particles in the chamber relates to the cyclotron frequency such that their ratio is greater than approximately one ($\Omega/\nu \geq 1$). Additionally, a collector is positioned to intercept the particles ($M_2$) in their orbits and to thereby separate the particles ($M_2$) from the particles ($M_1$).

19 Claims, 2 Drawing Sheets

OTHER PUBLICATIONS

Krishnan, M.; Centrifugal Isotope Separation in Zirconium Plasmas; *Phys. Fluids* 26(9); pp. 2676–2682; Sep., 1983.

Krishnan, Mahadevan; and Prasad, Rahul R.; Parametric Analysis of Isotope Enrichment in a Vacuum–Arc Centrifuge; J. Appl. Phys. 57(11); pp. 4973–4980; Jun., 1, 1985.

Prasad, Rahul R. and Krishnan, Mahadevan; Theoretical and Experimental Study of Rotation in A Vacuum–Arc Centrifuge; *J. Appl. Phys.*, vol. 61, No. 1; pp. 113–119; Jan. 1, 1987.

Prasad, Rahul R. and Mahadevan Krishnan; Article from *J. Appl. Phys.* 61(9); American Institute of Physics; pp. 4464–4470; May, 1987.

Qi, Niansheng and Krishnan, Mahadevan; *Stable Isotope Production*; p. 531.

Simpson, S.W.; Dallaqua, R.S.; and Del Bosco, E.; Acceleration Mechanism in Vacuum Arc Centrifuges; *J. Phys. D: Appl. Phys.* 29; pp. 1040–1046; UK, 1996.

Slepian, Joseph; *Failure of the Ionic Centrifuge Prior to the Ionic Expander*; p. 1283; Jun., 1955.

* cited by examiner

PLASMA MASS FILTER

This application is a continuation-in-part of application Ser. No. 09/192,945, filed Nov. 16, 1998, which issued as U.S. Pat. No. 6,096,220 on Aug. 1, 2000. The contents of application Ser. No. 09/192,945 are incorporated herein by reference.

FIELD OF THE INVENTION

The present invention pertains generally to devices and apparatus which are capable of separating charged particles in a plasma according to their respective masses. More particularly, the present invention pertains to filtering devices which extract particles of a particular mass range from a multi-species plasma. The present invention is particularly, but not exclusively, useful as a filter for separating low-mass particles from high-mass particles.

BACKGROUND OF THE INVENTION

The general principles of operation for a plasma centrifuge are well known and well understood. In short, a plasma centrifuge generates forces on charged particles which will cause the particles to separate from each other according to their mass. More specifically, a plasma centrifuge relies on the effect crossed electric and magnetic fields have on charged particles. As is known, crossed electric and magnetic fields will cause charged particles in a plasma to move through the centrifuge on respective helical paths around a centrally oriented longitudinal axis. As the charged particles transit the centrifuge under the influence of these crossed electric and magnetic fields they are, of course, subject to various forces. Specifically, in the radial direction, i.e. a direction perpendicular to the axis of particle rotation in the centrifuge, these forces are: 1) a centrifugal force, $F_c$, which is caused by the motion of the particle; :2) an electric force, $F_E$, which is exerted on the particle by the electric field, $E_r$; and 3) a magnetic force, $F_B$, which is exerted on the particle by the magnetic field, $B_z$. Mathematically, the magnitudes of each of these forces are respectively expressed as:

$F_c = Mr\omega^2$;

$F_E = eE_r$; and $F_B = er\omega B_z$

Where:

M is the mass of the particle;

r is the distance of the particle from its axis of rotation;

$\omega$ is the angular frequency of the particle;

e is the electric charge of the particle;

E is the electric field strength; and $B_z$ is the magnetic flux density of the field.

In a plasma centrifuge, it is universally accepted that the electric field will be directed radially inward. Stated differently, there is an increase in positive voltage with increased distance from the axis of rotation in the centrifuge. Under these conditions, the electric force $F_E$ will oppose the centrifugal force $F_c$ acting on the particle, and the magnetic force resulting from the E×B rotation aids the outward centrifugal forces. Accordingly, an equilibrium condition in a radial direction of the centrifuge can be expressed as:

$\Sigma F_r = 0$ (positive direction radially outward)

$F_c - F_E + F_B = 0$ $Mr\omega^2 - eE_r + er\omega B_z = 0$ (Eq. 1)

It is noted that Eq. 1 has two real solutions, one positive and one negative, namely:

$$\omega = -\Omega/2\left(1 \pm \sqrt{1 + 4E_r/(r\Omega B_z)}\right)$$

where $\Omega = eB_z/M_c$ is the cyclotron frequency of an ion with mass M.

For a plasma centrifuge, the intent is to seek an equilibrium to create conditions in the centrifuge which allow the centrifugal forces, $F_c$, to separate the particles from each other according to their mass. This happens because the centrifugal forces differ from particle to particle, according to the mass (M) of the particular particle. Thus, particles of heavier mass experience greater Fc and move more toward the outside edge of the centrifuge than do the lighter mass particles which experience smaller centrifugal forces. The result is a distribution of lighter to heavier particles in a direction outward from the mutual axis of rotation. As is well known, however, a plasma centrifuge will not completely separate all of the particles in the aforementioned manner.

As indicated above in connection with Eq. 1, a force balance can be achieved for all conditions when the electric field E is chosen to confine ions, and ions exhibit confined orbits. In the plasma filter of the present invention, unlike a centrifuge, the electric field is chosen with the opposite sign to extract ions. The result is that ions of mass greater than a cut-off value, $M_c$, are on unconfined orbits. The cut-off mass, $M_c$, can be selected by adjusting the strength of the electric and magnetic fields. The basic features of the plasma filter can be described using the Hamiltonian formalism.

The total energy (potential plus kinetic) is a constant of the motion and is expressed by the Hamiltonian operator:

$H = e\Phi + (P_r^2 + P_z^2)/(2M) + (P_\theta - e\Psi)^2/(2Mr^2)$ where $P_r = Mv_r$, $P_\theta = Mrv_\theta + e\Psi$, and $P_z = Mv_z$ are the respective components of the momentum and $e\Phi$ is the potential energy. $\omega = r^2 B_z/2$ is related to the magnetic flux function and $\Phi = V_{ctr} - \alpha\omega$ is the electric potential. $E = -\nabla\Phi$ is the electric field which is chosen to be greater than zero for the filter case of interest. We can rewrite the Hamiltonian:

$H = eV_{ctr} - e\alpha r^2 B_z/2 + (P_r^2 + P_z^2)/(2M) + (P_\theta - er^2 B_z/2)^2/(2Mr^2)$ We assume that the parameters are not changing along the z axis, so both $P_z$ and $P_\theta$ are constants of the motion. Expanding and regrouping to put all of the constant terms on the left hand side gives:

$H - eV_{ctr} - P_z^2/(2M) + P_\theta\Omega/2 = P_r^2/(2M) + (P_\theta^2/(2Mr^2)) + (M\Omega r^2/2)(\Omega/4 - \alpha)$ where $\Omega = eB_z/M$ is the cyclotron frequency.

The last term is proportional to $r^2$, so if $\Omega/4 - \alpha < 0$ then, since the second term decreases as $1/r^2$, $P_r^2$ must increase to keep the left-hand side constant as the particle moves out in radius. This leads to unconfined orbits for masses greater than the cut-off mass given by:

$M_C = e(B_z a)^2/(8V_{ctr})$ where a is the radius of the chamber.

We also used:

$\alpha = (\Phi_o - \Phi)/(\omega - \omega_o) = 2V_{ctr}/(a^2 B_z)$ (Eq. 2)

where $\Phi_0 = V_{ctr}$ and $\omega_o = 0$ while at r=a, $\phi = 0$ and $\omega = a^2 B_z/2$ So, for example, normalizing to the proton mass, $M_p$, we can rewrite Eq. 2 to give the voltage required to put higher masses on loss orbits:

$V_{ctr} < 1.2 \times 10^{-1} (a(m)B_z(gauss))^2/(M_C/M_P)$

Hence, a device radius of 1 m, a cutoff mass ratio of 100, and a magnetic field of 200 gauss require a voltage of 48 volts.

The same result for the cut-off mass in the plasma mass filter can again be obtained by looking at the simple force balance equation given by:

$\Sigma F_r = 0$ (positive direction radially outward)

$F_c + F_E + F_B = 0$ $Mr\omega^2 + eEr - er\omega B_z = 0$ (Eq. 3)

which differs from Eq. 1 by the signs of the electric field and magnetic forces and has the solutions:

$$\omega = \Omega/2 \left(1 \pm \sqrt{1 - 4E_r/(r\Omega B_z)}\right)$$

so if $4E_r/r\Omega B_z > 1$ then $\omega$ has imaginary roots and the force balance cannot be achieved. For a filter device with a cylinder radius "a", a central voltage, $V_{ctr}$, and zero voltage on the wall, the same expression for the cut-off mass is found to be:

$M_C = ea^2 B_z^2/(8 V_{ctr})$ and when the mass M of a charged particle is greater than the threshold value ($M > M_c$), the particle will continue to move radially outwardly until it strikes the wall, whereas the lighter mass particles will be contained and can be collected at the exit of the device. The higher mass particles can also be recovered from the walls using various approaches.

It is important to note that for a given device the value for $M_c$ in equation 3 is determined by the magnitude of the magnetic field, $B_z$, and the voltage at the center of the chamber (i.e. along the longitudinal axis), $V_{ctr}$. These two variables are design considerations and can be controlled.

To more fully appreciate the consequences of the mathematical computations set forth above, a comparison of the physics involved in the respective operations of a plasma mass filter and a plasma centrifuge is instructive. Although there are similarities between the two types of devices, these similarities are, for the most part, superficial. For instance, both types of devices establish an axially oriented magnetic field. Both establish crossed electric and magnetic fields (albeit the directions of the electric fields would be radially opposite to each other). And, both are intended to separate charged particles in a multi-species plasma from each other according to their mass. The similarities, however, end there.

An important distinction between plasma mass filters and plasma centrifuges is the fact that a plasma centrifuge operationally relies on collisions between the various charged particles in the plasma. Specifically, it is the collisions between light and heavy ions in a centrifuge that establish the operative mechanism for separating particles according to their mass. A plasma mass filter, on the other hand, does not use this collisional mechanism for its operation. In fact, to the contrary, a plasma mass filter relies on the avoidance of collisions between charged particles in the plasma. The purpose for doing this in a plasma mass filter is to thereby allow each charged particle to follow a predetermined trajectory. It then follows that the separation of charged particles in a plasma mass filter is possible because the respective trajectories of the particles differ according to the mass of the particular charged particle. This basic distinction leads to still other distinctions between a plasma mass filter and a plasma centrifuge.

Two major differences should be noted between the operational regimes of the centrifuge and the mass filter. First, the radial electric field in the conventional centrifuge is oriented inward to confine all of the ions. In terms of individual ion orbits, this electric field is the only radial force balancing the outwardly-directed centrifugal and vxB forces. In the filter, the electric field is oriented outward to extract ions. For masses below the cutoff mass the now inwardly-directed vxB force can balance the outwardly-directed electric and centrifugal forces to achieve radial confinement. For masses above the cutoff mass, however, the inwardly-directed vxB force is insufficient to balance the outwardly-directed electric and centrifugal forces and these ions are expelled.

The above orbit comparison ignores the effects of ion-ion collisions, which is the source of the second major difference between the filter and the centrifuge. The filter operates in a regime where the collisions are infrequent so that the trajectories are fundamentally those given by the balance of centrifugal, vxB, and electric forces; separation results primarily from the radial expulsion of the heavy particles with mass in excess of the cutoff mass. By contrast, the centrifuge achieves its more limited mass separation through collisions which drive the various ion species to a thermodynamic equilibrium state. In this equilibrium state, the ratio of the radial distributions of the light and heavy ion densities is a Gaussian whose half-width depends on the difference in the centrifugal forces between the heavy and light ions.

It is well known that the frequency of collisions between charged particles in a multi-species plasma is proportional to the density of the plasma. Furthermore, it is known that if a charged particle is able to avoid a collision with another particle, the unobstructed particle can be influenced by crossed electric and magnetic fields to follow a predetermined trajectory. Specifically, it is known that any particle having a charge, e, and a velocity, v, perpendicular to a magnetic field of intensity B will move along a circular path. Under these conditions, the number of revolutions the particle makes around this circular path per second is known as the cyclotron frequency, and can be mathematically expressed as; $\Omega = B_z e/m$, where m is the mass of the particle. It is important to note that, in line with the mathematics set forth above, the cyclotron frequency is independent of the velocity, v, of the particle.

As indicated above, it is an important concept for the operation of a plasma mass filter that the charged particles be able to avoid collisions with other charged particles in the plasma. Although, there can be no absolute assurances that collisions can be completely avoided, it is clear that the probability of collisions can be reduced simply by reducing the density of the plasma in the chamber. With this in mind, and for purposes of the present invention, a "collisional density" is defined as being the plasma density below which the mathematics disclosed above for the determination of $M_c$ are effective for describing the operation of the plasma mass filter. Stated differently, in a continuum, the "collisional density" is a transition point between the higher plasma densities which are useful for the operation of a plasma centrifuge and the lower plasma densities which are useful for the operation of a plasma mass filter. As a practical matter, a plasma mass filter is effective at densities below a "collisional density" wherein the ratio of the cyclotron frequency of particles to the collisional frequency of the particles is greater than approximately one.

To further contrast the operation of a plasma mass filter with the operation of a plasma centrifuge, it is to be appreciated that the trajectories of the lighter charged particles are established in a plasma mass filter so that these particles will exit the filter chamber for subsequent collection. Also, in order to maintain a charge balance in the filter chamber, electrons are removed from the chamber, as necessary, along with the lighter charged particles. On the other hand, because the trajectories of the heavier charged particles are different than the trajectories of the lighter charged particles, the heavier charged particles can be directed into contact with a collector which is located where the light charged particles do not travel. A plasma centrifuge has no such reliance on differences in trajectories. Instead, as discussed above, the centrifuge relies on collisions between particles which effectively disrupt their otherwise predictable trajectories.

In light of the above it is an object of the present invention to provide a plasma mass filter which effectively separates low-mass charged particles from high-mass charged particles. It is another object of the present invention to provide a plasma mass filter which has variable design parameters which permit the operator to select a demarcation between low-mass particles and high-mass particles. Yet another object of the present invention is to provide a plasma mass filter which is easy to use, relatively simple to manufacture, and comparatively cost effective.

SUMMARY OF THE PREFERRED EMBODIMENTS

A plasma mass filter for separating low-mass particles from high-mass particles in a multi-species plasma includes a cylindrical shaped wall which surrounds a hollow chamber and defines a longitudinal axis. Around the outside of the chamber is a magnetic coil which generates a magnetic field, $B_z$. This magnetic field is established in the chamber and is aligned substantially parallel to the longitudinal axis. Also, at one end of the chamber there is a series of voltage control rings which generate an electric field, $E_r$, that is directed radially outward and is oriented substantially perpendicular to the magnetic field. With these respective orientations, $B_z$, and $E_r$ create crossed magnetic and electric fields. Importantly, the electric field has a positive potential on the longitudinal axis, $V_{ctr}$, and a substantially zero potential at the wall of the chamber.

In the operation of the present invention, the magnitude of the magnetic field, $B_z$, and the magnitude of the positive potential, $V_{ctr}$, along the longitudinal axis of the chamber are set. A rotating multi-species plasma is then created in the chamber to interact with the crossed magnetic and electric fields. More specifically, for a chamber having a distance "a" between the longitudinal axis and the chamber wall, $B_z$, and $V_{ctr}$ are set and $M_c$ is determined by the expression:

$$M_c = ea^2(B_z)^2/8V_{ctr}$$

For multiple charged ions, e should be replaced by ze where z is the ion charge state and $M_c/z$ determines the confined ions. For simplicity, we assume z=1 in the discussion, but it should be clear it is the mass to charge that is being separated.

Consequently, of all the particles in the multi-species plasma, low-mass particles which have a mass less than the cut-off mass $M_c$ ($M<M_c$) will be confined in the chamber during their transit through the chamber. On the other hand, high-mass particles which have a mass that is greater than the cut-off mass ($M>M_c$) will be ejected into the wall of the chamber and, therefore, will not transit the chamber.

In the operation of the plasma mass filter, the density of the multi-species plasma in the chamber is maintained at a level below the "collisional density" of the plasma. Specifically, for purposes of the present invention, the "collisional density" is defined as being a density wherein the ratio of the cyclotron frequency of particles ($\Omega$) to their collisional frequency ($v$) is greater than approximately one ($\Omega/v \geq 1$). Thus, the less dense the plasma, the greater will be the value of the ratio of the cyclotron frequency to the collisional frequency. Within a multi-species plasma it will most likely happen that this ratio will have different values in different regions of the plasma. Typically, the higher densities (i.e. where the ratio is equal to approximately one) will be at or near the center of the plasma, while less dense plasma (i.e. where the ratio can be as much as approximately ten) will be near the periphery of the plasma.

It is axiomatic that the throughput of a plasma mass filter can be increased either by making the filter larger, by increasing the density in the multi-species plasma, by moving the plasma more rapidly through the filter, or by combining various aspects of these possibilities. There are, however, some practical considerations which may control the operational configuration of the filter. On the one hand, the less dense the multi-species plasma is as it is being processed by the filter, the more effective the filter will be in separating the heavier ions from the lighter ions. Less density in the multi-species plasma, however, results in lower throughput. On the other hand, when throughput is increased by increasing the density of the multi-species plasma, the collisional frequency of particles in the plasma will also increase. The consequence here is that, although throughput is increased, the effectiveness of particle separation is decreased. Additionally, there are practical limitations on how fast the plasma can be moved through the filter. In all cases, the trade-off between the quality of particle separation and the increase in throughput is an important consideration when establishing the operational parameters of a plasma mass filter.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
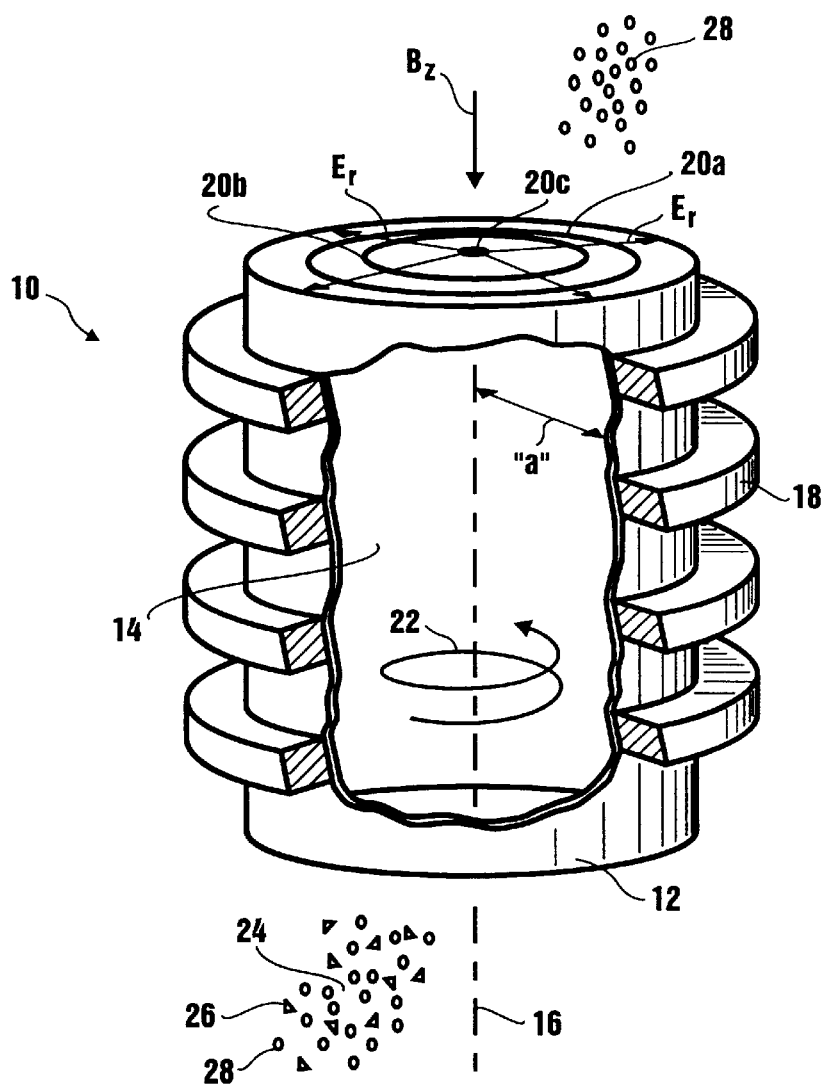
FIG. 1 is a perspective view of the plasma mass filter with portions broken away for clarity.

Referring to FIG. 1, a plasma mass filter in accordance with the present invention is shown and generally designated 10. As shown, the filter 10 includes a substantially cylindrical shaped wall 12 which surround a chamber 14, and defines a longitudinal axis 16. The actual dimensions of the chamber 14 are somewhat, but not entirely, a matter of design choice. Importantly, the radial distance "a" between the longitudinal axis 16 and the wall 12 is a parameter which will affect the operation of the filter 10, and as clearly indicated elsewhere herein, must be taken into account.

Figure 2:
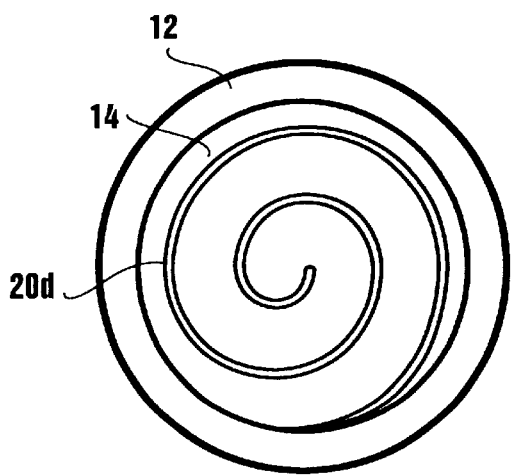
FIG. 2 is a top plan view of an alternate embodiment of the voltage control.

It is also shown in FIG. 1 that the filter 10 includes a plurality of magnetic coils 18 which are mounted on the outer surface of the wall 12 to surround the chamber 14. In a manner well known in the pertinent art, the coils 18 can be activated to create a magnetic field in the chamber which has a component $B_z$, that is directed substantially along the longitudinal axis 16. Additionally, the filter 10 includes a plurality of voltage control rings 20, of which the voltage rings 20a–c are representative. As shown these voltage control rings 20a–c are located at one end of the cylindrical shaped wall 12 and lie generally in a plane that is substantially perpendicular to the longitudinal axis 16. With this combination, a radially oriented electric field, $E_r$, can be generated. An alternate arrangement for the voltage control is the spiral electrode 20d shown in FIG. 2.

For the plasma mass filter 10 of the present invention, the magnetic field $B_z$ and the electric field Er are specifically oriented to create crossed electric magnetic fields. As is well known to the skilled artisan, crossed electric magnetic fields cause charged particles (i.e. ions) to move on helical paths, such as the path 22 shown in FIG. 1. Indeed, it is well known that crossed electric magnetic fields are widely used for plasma centrifuges. Quite unlike a plasma centrifuge, however, the plasma mass filter 10 for the present invention requires that the voltage along the longitudinal axis 16, $V_{ctr}$, be a positive voltage, compared to the voltage at the wall 12 which will normally be a zero voltage.

In the operation of the plasma mass filter 10 of the present invention, a rotating multi-species plasma 24 is injected into the chamber 14. Under the influence of the crossed electric magnetic fields, charged particles confined in the plasma 24 will travel generally along helical paths around the longitudinal axis 16 similar to the path 22. More specifically, as shown in FIG. 1, the multi-species plasma 24 includes charged particles which differ from each other by mass. For purposes of disclosure, the plasma 24 includes at least two different kinds of charged particles, namely high-mass particles 26 and low-mass particles 28. As intended for the present invention, however, it will happen that only the low-mass particles 28 are actually able to transit through the chamber 14.

In accordance with mathematical calculations set forth above, the demarcation between low-mass particles 28 and high-mass particles 26 is a cut-off mass, $M_c$, which can be established by the expression:

$$M_c = ea^2(B_z)^2/8V_{ctr}.$$

In the above expression, e is the charge on an electron, a is the radius of the chamber 14, $B_z$, is the magnitude of the magnetic field, and $V_{ctr}$ is the positive voltage which is established along the longitudinal axis 16. Of these variables in the expression, e is a known constant. On the other hand, "a", $B_z$, and $V_{ctr}$ can all be specifically designed or established for the operation of plasma mass filter 10.

Due to the configuration of the crossed electric magnetic fields and, importantly, the positive voltage $V_{ctr}$ along the longitudinal axis 16, the plasma mass filter 10 causes charged particles in the multi-species plasma 24 to behave differently as they transit the chamber 14. Specifically, charged high-mass particles 26 (i.e. $M > M_c$) are not able to transit the chamber 14 and, instead, they are ejected into the wall 12. On the other hand, charged low-mass particles 28 (i.e. $M < M_c$) are confined in the chamber 14 during their transit through the chamber 14. Thus, the low-mass particles 28 exit the chamber 14 and are, thereby, effectively separated from the high-mass particles 26.

During the operation of the plasma mass filter 10 of the present invention, the density of the multi-species plasma 24 in the chamber 14 is maintained below the "collisional density" of the plasma 24. As defined herein, this "collisional density" is established as that point in the continuum of densities wherein the ratio of the cyclotron frequency ($\Omega$) of particles 26, 28 in the plasma 24 to the collisional frequency (v) of the particles 26, 28 is greater than approximately one ($\Omega/v \geq 1$). For values of this ratio above one (i.e. where the density of the plasma 24 is decreased) the mathematics disclosed herein effectively predict the differences between the trajectories of the high-mass particles 26, and the trajectories of the low-mass particles 28.

Figure 3:
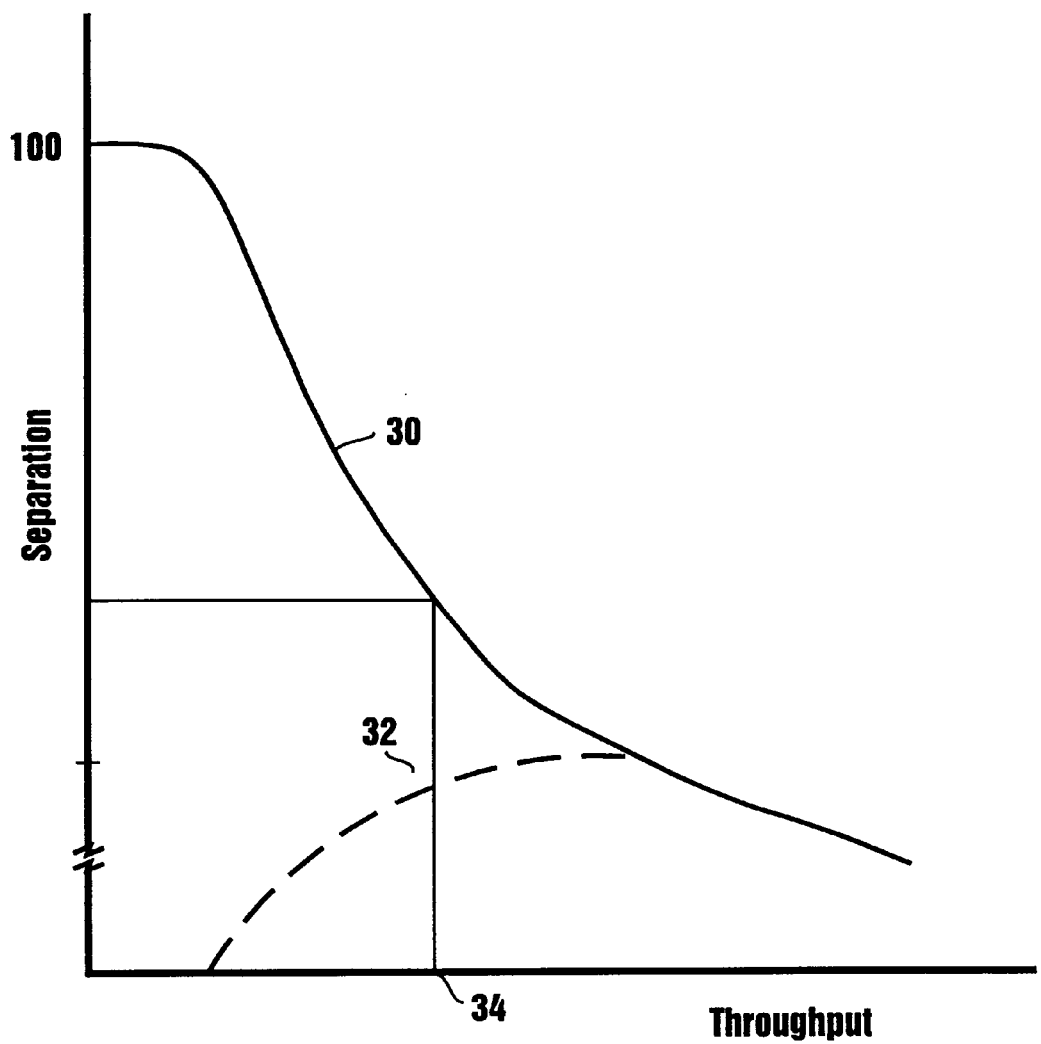
FIG. 3 is a graph showing the relationship between particle separation and throughput.

In FIG. 3, an idealized representation of the relationship between particle separation and throughput is shown for the purpose of illustrating the trade-offs that are involved in the operation of a plasma mass filter 10 and high-lighting the operational differences between a plasma mass filter 10 and a centrifuge (not shown). Specifically, the graph line 30 pertains to the intended operation of a plasma mass filter 10, while the graph line 32 pertains generally to the expected performance of a plasma centrifuge. Further, as contemplated in FIG. 3, it is to be appreciated that the throughput of the filter 10, or of a centrifuge, is a function of the density of the plasma 24.

With the above in mind, the graph line 30 is shown in FIG. 3 to indicate that as the throughput and density of the plasma 24 are increased, the quality of separation of particles 26, 28 by the filter 10 will necessarily decrease. This trend is due, in large part, to the increased probability of particle collisions in the plasma 24. For increases in throughput (i.e. increases in the density of plasma 24), beyond the point 34, it will be seen that the expected operational parameters for both a plasma mass filter 10 and a centrifuge become quite similar. On the other hand, using the point 34 to represent the "collisional density" of the plasma 24, it will be noted that the filter 10 is significantly more efficient than a centrifuge for separating particles 26, 28 in the plasma 24 at lower throughputs (densities). Under these same low throughput (density) conditions, a centrifuge is not so efficient because the probability of particle collisions is low and the collisional mechanism for effective operation of the centrifuge is not fully implemented. As indicated by the dashed line 32, the operation of a centrifuge in low throughput (density) conditions is relatively inefficient. Accordingly, when efficient particle separation is an overriding concern, a plasma mass filter 10 should be used and configured according to the mathematics set forth above. Importantly, the plasma mass filter 10 should be operated with densities below the "collisional density" as defined herein.

While the particular Plasma Mass Filter as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A method for separating charged particles according to their mass which comprises the steps of:

providing a multi-species plasma in a chamber, said chamber defining an axis and said plasma including relatively low-mass particles ($M_1$) and relatively high-mass particles ($M_2$);

creating crossed electric and magnetic fields (E×B) in said chamber for rotating said particles $M_1$ and $M_2$ in respective orbits around said axis, with each orbit of each particle being characteristic of the mass of said particle, and for generating a respective cyclotron frequency $\Omega = Be/M$, where e is the electric charge of the particle, and M is the mass of the respective particle for each said particle in said chamber;

maintaining said multi-species plasma with a density in said chamber wherein said particle has a collisional frequency (ν) with other said particles, and wherein a ratio of said cyclotron frequency to said collisional frequency is greater than approximately one ($\Omega/\nu \geq 1$); and positioning a collector to intercept said relatively high-mass particles ($M_2$) in their orbits to separate said relatively high-mass particles ($M_2$) from said relatively low-mass particles ($M_1$).

2. A method as recited in claim 1 wherein said chamber is substantially cylindrical shaped and said axis is a longitudinal axis defined by said chamber.

3. A method as recited in claim 2 wherein said chamber is at least partially enclosed by a wall located at a distance "a" from said longitudinal axis, wherein said magnetic field is oriented in a direction substantially parallel to said longitudinal axis and has a magnitude "$B_z$", wherein said electric field is established with a positive potential on said longitudinal axis having a magnitude "$V_{ctr}$", and wherein said wall has a substantially zero potential, such that $M_1 < M_c < M_2$ and $M_c = ea^2(B_z)^2/8V_{ctr}$.

4. A method as recited in claim 3 wherein said collector is said wall of said chamber.

5. A method as recited in claim 3 wherein said cylindrical chamber has a first end and a second end and wherein said creating step includes the steps of:

mounting a plurality of magnetic coils on said wall of said chamber between said first end and said second end to establish said magnetic field (B); and placing an electrode at said first end of said chamber.

6. A method as recited in claim 5 wherein said electrode comprises a plurality of coplanar concentric conducting rings.

7. A method as recited in claim 5 wherein said electrode is a spiral electrode.

8. A method as recited in claim 5 further comprising the step of placing an electrode at said second end of said chamber.

9. A method for separating charged particles according to their mass which comprises the steps of:

creating a crossed electric and magnetic fields (E×B) in a chamber;

providing a plurality of charged particles having a relatively low-mass ($M_1$) for travel in a respective first orbit along a path in said chamber, said first orbit being characteristic of said mass of said particle $M_1$ in said crossed electric and magnetic fields (E×B);

providing a plurality of charged particles having a relatively high-mass ($M_2$) for travel in a respective second orbit along a path in said chamber, said second orbit being characteristic of said mass of said particle $M_2$ in said crossed electric and magnetic fields (E×B), wherein each said charged particle ($M_1$ and $M_2$) has a respective cyclotron frequency $\Omega = Be/M$, where e is the electric charge of the particle, and M is the mass of the respective particle in said chamber and said method further comprises the step of maintaining a density for said particles in said chamber wherein said particles have a collisional frequency (ν) with other said particles, and wherein a ratio of said cyclotron frequency to said collisional frequency is greater than approximately one ($\Omega/\nu \geq 1$); and positioning a collector to intercept said relatively high-mass particles ($M_2$) in their second orbits to separate said relatively high-mass particles ($M_2$) from said relatively low-mass particles ($M_1$).

10. A method as recited in claim 9 wherein said chamber is substantially cylindrical shaped and defines a longitudinal axis with said crossed electric and magnetic fields (E×B) rotating said charged particles ($M_1$ and $M_2$) around said axis.

11. A method as recited in claim 10 wherein said chamber is at least partially enclosed by a wall located at a distance "a" from said longitudinal axis, wherein said magnetic field is oriented in a direction substantially parallel to said longitudinal axis and has a magnitude "$B_z$", wherein said electric field is established with a positive potential on said longitudinal axis having a magnitude "$V_{ctr}$", and wherein said wall has a substantially zero potential, such that $M_1 < M_c < M_2$ and $M_c = ea^2(B_z)^2/8V_{ctr}$.

12. A method as recited in claim 11 wherein said collector is said wall of said chamber.

13. A method as recited in claim 11 wherein said cylindrical chamber has a first end and a second end and wherein said creating step includes the steps of:

mounting a plurality of magnetic coils on said wall of said chamber between said first end and said second end to establish said magnetic field (B); and placing an electrode at said first end of said chamber.

14. A method as recited in claim 13 wherein said electrode comprises a plurality of coplanar concentric conducting rings.

15. A method as recited in claim 13 wherein said electrode is a spiral electrode.

16. A method as recited in claim 13 further comprising the step of placing an electrode at said second end of said chamber.

17. A method as recited in claim 16 wherein the source region is approximately midway between the electrodes, and collectors for the light mass particles are at both ends of the cylinder.

18. A device for separating charged particles according to their mass which comprises:

means for providing a multi-species plasma in a chamber, said chamber defining an axis, said chamber is at least partially enclosed by a wall located at a distance "a" from said longitudinal axis, and said plasma including relatively low-mass particles ($M_1$) and relatively high-mass particles ($M_2$);

means for creating crossed electric and magnetic fields (E×B) in said chamber for rotating said particles $M_1$ and $M_2$ in respective orbits around said axis, wherein said magnetic field is oriented in a direction substantially parallel to said longitudinal axis and has a magnitude "$B_z$", wherein said electric field is established with a positive potential on said longitudinal axis having a magnitude "$V_{ctr}$", and wherein said wall has a substantially zero potential, such that $M_1 < M_c < M_2$ and $M_c = ea^2(B_z)^2/8V_{ctr}$ with each orbit of each particle being characteristic of the mass of said particle, and for generating a respective cyclotron frequency $\Omega = Be/M$, where e is the electric charge of the particle, and M is the mass of the respective particle for each said particle in said chamber;

means for maintaining said multi-species plasma with a density in said chamber wherein said particle has a collisional frequency ($v$) with other said particles, and wherein a ratio of said cyclotron frequency to said collisional frequency is greater than approximately one ($\Omega/v \geq 1$); and a collector positioned to intercept said relatively high-mass particles ($M_2$) in their orbits to separate said relatively high-mass particles ($M_2$) from said relatively low-mass particles ($M_1$).

19. A device as recited in claim 18 wherein said chamber is substantially cylindrical shaped and said axis is a longitudinal axis defined by said chamber.

* * * * *

UNITED STATES PATENT AND TRADEMARK OFFICE
CERTIFICATE OF CORRECTION

PATENT NO. : 6,248,240 B1
DATED : June 19, 2001
INVENTOR(S) : Tihiro Ohkawa

It is certified that error appears in the above-identified patent and that said Letters Patent is hereby corrected as shown below:

Column 1,
Line 35, delete ":"

Column 2,
Line 37, delete "$\omega$" insert -- $\Psi$ --
Line 38, delete "$\omega$" insert -- $\Psi$ --
Line 60, delete "$\omega$-$\omega_o$" insert -- $\Psi$ - $\Psi_o$ --
Line 62, delete "$\omega_o$ and $\omega$" insert -- $\Psi_o$ - $\Psi$ --
Line 67, delete "<" insert -- > --

Column 3,
Line 15, delete "$\omega$" insert -- $\omega$ --

Column 5,
Line 31, delete "Bz" insert -- $B_z$ --

Column 7,
Line 12, delete "Er" insert -- $E_r$ --

Signed and Sealed this

Nineteenth Day of February, 2002

*Attest:*

JAMES E. ROGAN
*Attesting Officer*      *Director of the United States Patent and Trademark Office*